March 11, 1969     D. W. BOTSTIBER     3,432,750
CHIP DETECTOR FOR MAGNETIC AND NON-MAGNETIC
CONDUCTIVE PARTICLES
Filed Oct. 31, 1967
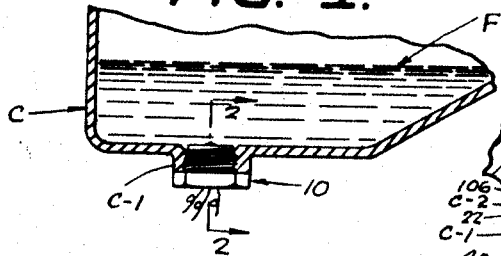
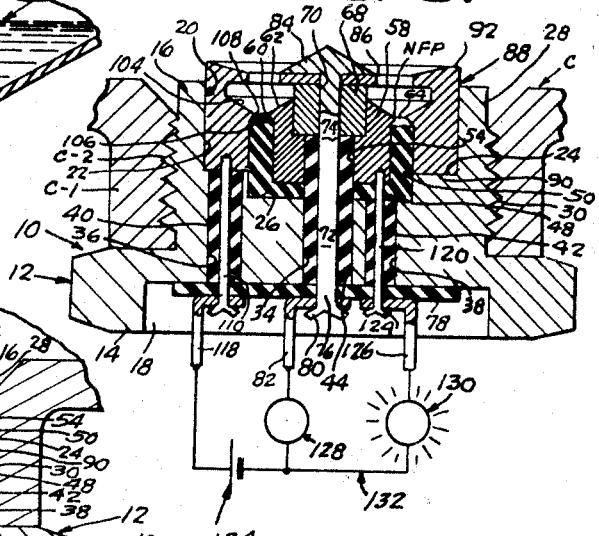
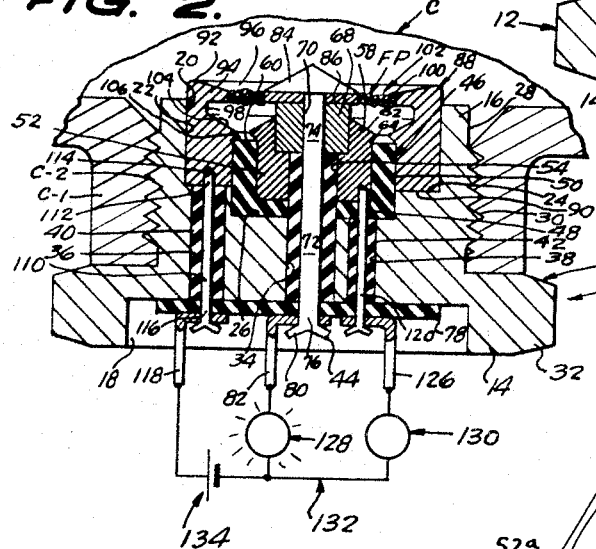
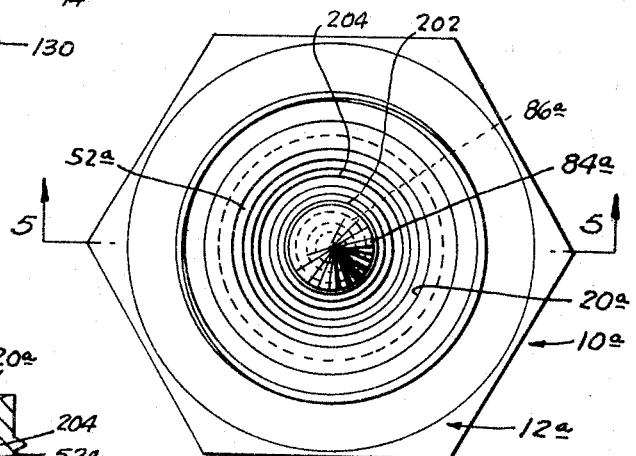
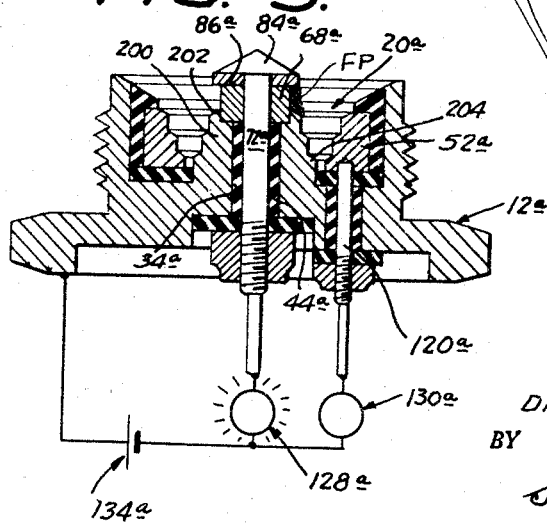
INVENTOR.
DIETRICH W. BOTSTIBER,
BY
Sperry and Zoda,
ATTORNEYS.

United States Patent Office 3,432,750
Patented Mar. 11, 1969

3,432,750
CHIP DETECTOR FOR MAGNETIC AND NON-MAGNETIC CONDUCTIVE PARTICLES
Dietrich W. Botstiber, Glenolden, Pa. 19036
Filed Oct. 31, 1967, Ser. No. 679,455
U.S. Cl. 324—41
Int. Cl. G01r 33/12
10 Claims

ABSTRACT OF THE DISCLOSURE

A detector having a chamber in contact with a fluid medium with impurities of differing compositions therein, the detector including means to differentiate the impurities by composition and to selectively signal accumulation of a predetermined quantity of each.

BACKGROUND OF THE INVENTION

Field of the invention

A device employed in liquid testing to determine the presence of particulate or other foreign materials, which signals the accumulation of the materials and which indicates the type of material accumulated.

Description of the prior art

It has been previously known to provide a chip detector or signal apparatus used in conjunction with fluid media in a carrier, such as the crankcase of an internal combustion engine. Such prior apparatus have included magnetic filters operating to indicate the presence of ferrous particles in oils, and the like. Previous patents in this general field include the following: Botstiber, Patent Nos. 3,317,042 and 2,936,890; Booth, Patent No. 2,462,715; Bourne, Patent No. 2,450,630; and Schrader, Patent No. 2,349,992.

SUMMARY OF THE INVENTION

In numerous environments of use where fluid media is contaminated by particulate substances, it is desirable to determine the presence of such particulate substances either as an indication of the condition of the media or, in most instances, as an indication of a possible maintenance problem in connection with the apparatus serviced by the fluid media. In the employment of prior detectors, it is possible to signal the accumulation of a quantity of contaminates, and to magnetically attract the contaminates to a filter or the like. The present invention has a general objective similar to that met by the devices of prior art, but differs therefrom in that it provides a means for differentiation of ferrous and other magnetizable substances from non-ferrous substances with a separate signalling circuit for each such substance. The invention thus provides a means for separating ferrous particles from non-ferrous contaminates, and for signalling an accumulation of each type of contaminate separately.

It is a basic objective of the present invention to provide a detector as aforesaid wherein the signal circuit activated by the accumulation of ferrous particles is independent and separate of a signal circuit activated by non-ferrous particles. This condition is of importance in connection with employment of the apparatus in internal combustion engines, gas turbines, and the like, in which example the accumulation of ferrous particles indicates the beginning failure of a bearing or the like, while the signal of an accumulation of non-ferrous particles indicates the likelihood of beginning failure of turbine blades, sleeve bearings, or other non-ferrous components.

This invention contemplates the provision of a concentrated magnetic field serving to screen out ferrous particles and to permit the passage of non-ferrous particles, and may take various forms and arrangements in achieving this objective, as will appear more fully hereinafter. The present apparatus may be advantageously combined with suitably arranged screening means such as that described in Patent No. 3,317,042, or with self-closing valves such as that disclosed in Patent No. 2,983,-385 and others.

Another objective of the invention resides in the provision of apparatus providing a concentrated magnetic field arranged upstream of the direction of flow of a gap between two electrodes, one of which may be combined with the apparatus in the formation of the field.

Yet another structural objective of the invention is to provide contacts for accumulated particulate materials which have sharpened edges or burrs arranged such that they tend to cut through any oil film surrounding the contaminates and therefore to provide improved electrical contact employing the contaminates.

Other and further objects and advantages of the invention will become apparent to those skilled in the art upon consideration of the following specification, when read in conjunction with the annexed drawings.

BRIEF DESCRIPTION OF THE DRAWINGS

FIGURE 1 is a sectional view of a typical carrier having a discriminating chip detector constructed and assembled in accordance with this invention mounted in place therein;

FIGURE 2 is an enlarged sectional view taken substantially on the section line 2—2 of FIGURE 1, looking in the direction of the arrows, and diagrammatically illustrating a signal circuit of the invention as energized responsive to a first operating condition;

FIGURE 3 is a view similar to FIGURE 2, showing the circuit as energized in response to a second operating condition;

FIGURE 4 is a top plan view showing a modified form of the invention; and

FIGURE 5 is a sectional view taken substantially on the section line 5—5 of FIGURE 4, showing details of said modification.

DESCRIPTION OF THE PREFERRED EMBODIMENTS

Referring to the drawings in more detail, and initially to the first embodiment of the invention selected for illustration by way of non-limiting example herein, in FIGURES 1 through 3, reference numeral 10 identifies the detector generally. The detector comprises a body portion 12 of any suitable material having an outer side portion 14 and an inner side portion 16. The portion 14 has a shallow outer depression 18 therein, and a main chamber 20 is formed in the body portion to open on the side 16. The chamber 20 is defined by a side wall 22, and by a base wall 24 which has a depressed central section 26. The body portion has an exterior surface 28 with thread means 30 or other suitable carrier engagement means thereon. Adjacent its outer side portion 14, a circumferential lateral extension 32, having suitable flats for tool contact, is provided to permit mounting and dismounting of the detector in a carrier C having a wall C-1, with corresponding thread means C-2. A fluid medium F is contained within the carrier C, which may, as indicated above, comprise a crankcase oil container associated with an internal combustion engine.

The body portion has a central bore 34 formed therein and extending through that section thereof disposed between the main chamber and the shallow depression 18. A pair of vertical contact bores 36 and 38 are also provided, and are arranged on opposite scides of the central bore.

Each of the contact bores has an insulating sleeve 40, 42 frictionally engaged therein and extending substantially the full height of the bore. The central bore has a tubular sleeve 44 engaged thereon, but the sleeve 44 is extended upwardly into the main chamber beyond the height of the bore.

A cup-form insulator 46, comprising an apertured base 48 and side wall 50, is seated in the depressed central section 26 of the main chamber, and the sleeve 44 projects therethrough from the central bore.

Mounted on the projecting portion of the sleeve 44 is an electrically conductive sleeve 52 which is of generally cylindrical form and has a central opening 54 engaged about the sleeve 44 and also has an enlarged upper portion 56. The upper end section 58 of the conductive sleeve 52 has an outer peripheral groove 60 and is bevelled at 62 to provide an inclined top wall terminating at a sharp edge 64. As will be observed in the drawing, a slender, sharp tooth or burr exists at said edge by virtue of this tapering, serving a function below.

An annular magnet 68 is frictionally engaged in the enlarged upper portion 56 of the central opening 54 of the conductive sleeve 52. The magnet is of the electrically nonconductive variety disclosed in prior United States Patent No. 2,936,890. A central passageway 70 of the magnet is aligned with the bore of the insulating sleeve 44, thus defining a through opening of substantially the full vertical extent of the detector.

A central contact 72 is disposed in the aforesaid through opening and has an inward end section 74 and an opposite outer end section 76. An insulator pad 78 is provided in the depression 18, and the contact 72 extends through the pad and is outwardly flared at 80 for connection with a first electrical lead 82. At its inward end section 74, the contact has a section 84 in the form of a shallow cone, of none-ferrous material. Disposed on the contact 72 between the section 84 and the magnet 68 is a thin disk 86 of ferrous metal, which is magnetized by virtue of its direct contact with the magnet 68 and is additionally electrically conductive and in contact with the electrically conductive contact element 72.

Seated in the main chamber 20 and projecting outwardly of the upper side 16 of the body portion is an annular ring member 88 also formed of ferrous metal or similar conductive material. The ring member includes a base 90 directly seated on the chamber base 24, and a top edge 92. An inward lip 94 is defined by an inclined top wall 96 and by a slot 98 about the inner circumference of the ring member. A vertical wall 100 of the lip is aligned with, and closely spaced to, the disk 86. In view of the ferrous nature of the ring member and its lip, this proximity of the edge 100 to the disk 86 creates a concentrated magnetic field at the area 102 therebetween, the function of which appears below.

As seen in FIGURES 2 and 3 of the drawing, the ring member has a second inwardly inclined wall at 104 with an undercut slot 106 forming a circumferential pointed tip in the form of a tooth or burr 108 aligned with the sharp edge 64 of the conductive sleeve 58.

A first contact rod 110 extends through the sleeve 40 of the bore 36, and has a pointed end 112 seated in a cavity 114 formed in the ring member. The opposite end 116 of the contact rod 110 extends through the pad 78 and is flared for engagement with a lead 118 of the signal circuit. Extending through the sleeve 42 of the bore 38 is a second contact rod 120. This rod 120 projects through the base 48 of the cup-form insulator 46 and into a socket 122 formed in the conductive sleeve 52. At its outside end, the rod 120 is flared at 124 for connection with a lead 126.

As seen in FIGURES 2 and 3 once again, the lead 82 is connected to a line having a first signal means 128, such as a light, therein, while the lead 126 is connected to a line having a second signal means 130 therein. Each of the leads, 82, 118, and 126, is connected to an electrical transmission line 132 having an energy source 134 therein.

In the operation of the device, the proximity of the vertical wall 100 of the lip of the ring member 88 to the magnetized ferrous disk 86, creating a concentrated magnetic field therebetween, causes ferrous or other magnetizable particles FP in the fluid medium M within the carrier C to be attracted and held therebetween. When this accumulation of ferrous particles between the lip and the disk bridges the gap therebetween, an electrical circuit is completed through the main contact, the disk, the particles and the ring member and through the first contact rod 110 and its lead 118. As shown in FIGURE 2, this energizes the signal 128, thereby signalling the beginning failure of an element of the engine or other apparatus associated with the detector insofar as ferrous elements are concerned. Non-ferrous particles, NFP in the drawing, are not attracted by the magnetic field, and therefore gravitate into the chamber and down the inclined wall 104 to a location within the slot 106. When this accumulation of particles is of sufficient magnitude to bridge the gap between the pointed tooth 64 of the contact sleeve 52 and the pointed tip 108 of the ring member, an electrical circuit is completed through the contact sleeve, and the second contact rod 120 to energize the signal 130. Thus, the beginning failure of non-ferrous engine elements is signalled.

In FIGURES 4 and 5 a modification of the invention is shown, and reference numerals corresponding to those employed in the first form of the invention are used, the letter *a* being appended for distinction. There, the detector 10*a* is formed in such manner as to eliminate one of the contact rods and to employ the body portion directly in completion of a circuit. The main contact 72*a* extends through an insulator sleeve 44*a* in a bore 34*a*, and the body portion 12*a* includes a stepped boss element 200 projecting into the chamber 20*a*. The upper step of the element 200 is disposed about the magnet 68*a* and forms a ledge which creates a magnetic field between the disk 86*a* and the ferrous body 12*a*. As seen in FIGURE 5, ferrous particles are thereby attracted to the location between the disk 86*a* and the ledge 202 thus to energize the signal circuit and activate the signal 128*a*.

In this form of the invention, the contact sleeve 52*a* takes the form of an annular ring oppositely stepped with respect to the element 200. Non-ferrous particles which bypass the magnetic field at the entry point of the main chamber gravitate to the position between the lower step 204 of the element 200 and the base of the contact sleeve 52*a*. This creates a bridging circuit between the body portion 12*a* and the contact rod 120*a*, effective to energize the circuit and activate the signal 130*a*.

I claim:
1. A discriminating chip detector for detection of an accumulation of magnetizable and non-magnetizable chips in a fluid medium disposed in a carrier, the detector comprising:
 a detector body portion on the carrier;
 ring means associated with the body portion and including first electrode means;
 a conductor stem operatively engaged with the body portion and electrically insulated therefrom;
 second magnetic electrode means on said stem, aligned with the first electrode means to define a magnetic field between the first and second electrodes and to activate a first signal circuit upon accumulation of magnetizable materials therebetween to span the distance between the first and second electrode means; and
 third electrode means operatively associated with the body portion and insulated therefrom, positioned such that non-magnetizable materials passing through said magnetic field are adapted, upon build-up of predetermined magnitude, to bridge the distance be- tween the body portion and the third electrode means to activate a second signal circuit.

2. The invention of claim 1, wherein:
the body portion has a main chamber therein;
the stem extends through the body portion and into the chamber; and
the stem having a non-electrically conductive magnetic element thereon and a ferrous disk.

3. The invention of claim 1, wherein:
the ring means comprises a conductive, annular ring member seated in the body portion and having an inward lip;
rod means electrically contacting the ring member and being disposed in an electrical circuit with an energy source;
a ferrous disk on the shaft;
a magnet on the shaft in contact with the disk; and
the magnetic field being located between the disk and the ring member.

4. The invention of claim 1, wherein:
the third electrode means comprises a conductor sleeve about said stem; and
a rod electrically contacting the conductor sleeve in a circuit including an energy source.

5. The invention of claim 1, wherein:
the body portion has a chamber therein and includes a stepped interior wall facing the chamber; and
the third electrode means includes a stepped sleeve element facing the stepped interior wall to define separate contact areas.

6. The invention of claim 1, wherein:
the body portion is engaged with the carrier with an internal side of the body portion disposed within the carrier and with an exposed exterior side;
the stem means and the electrode means projecting through the body portion and the signal circuit being exteriorly arranged.

7. The invention of claim 6, wherein:
the stem has a magnet thereon to energize the magnetic field.

8. The invention of claim 7, wherein:
the magnetic field is located between the stem and the body portion.

9. A discriminating chip detector for use in a system involving detection of non-magnetizable and magnetizable particles in a fluid medium, the fluid medium being in a carrier, the detector comprising:
a detector body portion having an exterior surface with carrier engagement means thereon whereby it is mounted in contact with the fluid medium;
the body portion having a main chamber therein and having a central bore extending therethrough and communicating with the main chamber, with a pair of contact bores arranged on either side of the central bore and communicating with the main chamber;
insulating sleeve means mounted in each of said bores;
a central contact extended through the insulating sleeve of the central bore, having an inward end section disposed in contact with the fluid medium exteriorly of the main chamber;
the inward end section having an enlarged head with a central apex and a side surface inclined in the direction of the chamber from the apex, the inclined side surface being of non-magnetizable material;
a ferrous disk on the central contact below the enlarged head;
an electrically non-conductive magnet on the central contact between the ferrous disk and the insulating sleeve means of the central bore;
an annular ring member, formed of ferrous metal, fixed in the main chamber, the ring member having an inward, peripheral lip with an inwardly inclined top wall, and having an annular chamber therein below the lip;
the ring member having an inclined internal shoulder;
the lip and the ferrous disk defining a thin space with a concentrated magnetic field attracting and holding magnetizable particles, but permitting passage of non-magnetizable particles;
a first contact rod extending through the insulating sleeve of one of said contact bores and being in electrical contact with said ring member, whereby, upon build-up of magnetizable particles to an extent bridging the the distance between the disk and the lip, a first signal circuit is activated;
a conductive sleeve portion surrounding the magnet and having an inclined top edge laterally aligned with the internal shoulder of the ring member;
insulation means between the ring member and the conductive sleeve portion; and
a second contact rod extending through the insulating sleeve of the other of said contact bores and electrically contacting the conductive sleeve, whereby upon accumulation of non-magnetizable particles between the internal shoulder of the ring member and the top edge of the conductive sleeve portion a second signal circuit is activated.

10. A discriminating chip detector for use in a system involving detection of non-magnetizable and magnetizable particles in a fluid medium, the fluid medium being in a carrier, the detector comprising:
a detector body portion operatively engaged with the carrier and having an inner side in contact with the fluid medium;
the body portion having a main chamber therein and having a central bore extending therethrough communicating with said chamber;
at least one contact bore extending through the body portion and into the chamber;
insulating sleeve means mounted in each of said bores;
a central contact extended through the insulation sleeve of the central bore;
a ferrous disk on said central contact;
an electrically non-conductive magnet on the central contact engaged with the ferrous disk thereof;
a contact rod extending through the insulating sleeve of the other of said bores;
the body portion having an internal boss member including a ledge vertically spaced from said ferrous disk on the opposite side of said magnet whereby a concentrated magnetic field is established between the ledge and the disk;
a contact rod extending through the insulating sleeve of the other bore;
the concentrated magnetic field attracting and holding magnetizable particles and establishing an electrical circuit between the ferrous disk, the body portion, and the central contact to activate a first signal circuit; and
the build-up of non-magnetizable particles between said boss and said contact rod establishing a second signalling circuit to activate the second signal means responsive to build-up of non-magnetizable particles.

References Cited

UNITED STATES PATENTS

| | | | |
|---|---|---|---|
| 2,878,342 | 3/1959 | Arthur | 200—61.09 |
| 3,193,815 | 7/1965 | Prestel | 340—270 X |

RUDOLPH V. ROLINEC, *Primary Examiner.*

A. E. SMITH, *Assistant Examiner.*

U.S. Cl. X.R.

200—61.09; 335—305; 340—270